(12) United States Patent
Clute et al.

(10) Patent No.: US 9,248,803 B2
(45) Date of Patent: Feb. 2, 2016

(54) BELT RETRACTOR WITH A SWITCHABLE FORCE-LIMITING DEVICE FOR A SEATBELT OF A MOTOR VEHICLE

(75) Inventors: Günter Clute, Elmshorn (DE); Adrian Bud, Dalsjöfors (SE); Per Axblom, Alingsås (SE); Lena Sandelius, Landvetter (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 229 days.

(21) Appl. No.: 13/990,846

(22) PCT Filed: Nov. 12, 2011

(86) PCT No.: PCT/EP2011/005710
§ 371 (c)(1),
(2), (4) Date: Jul. 12, 2013

(87) PCT Pub. No.: WO2012/072194
PCT Pub. Date: Jun. 7, 2012

(65) Prior Publication Data
US 2013/0277483 A1    Oct. 24, 2013

(30) Foreign Application Priority Data
Dec. 2, 2010 (DE) .......................... 10 2010 053 041

(51) Int. Cl.
*B60R 22/34* (2006.01)
*B60R 22/28* (2006.01)

(52) U.S. Cl.
CPC ............. *B60R 22/34* (2013.01); *B60R 22/3413* (2013.01); *B60R 2022/288* (2013.01)

(58) Field of Classification Search
CPC .................... B60R 22/4628; B60R 2022/4642
USPC ............................................. 242/374; 60/632
See application file for complete search history.

(56) References Cited

U.S. PATENT DOCUMENTS 3,106,131 A    10/1963    Barr et al.
3,404,598 A    10/1968    Angelos
(Continued)

FOREIGN PATENT DOCUMENTS

DE    197 80 583 C1    1/2001
DE    199 27 427 A1    1/2001
(Continued)

OTHER PUBLICATIONS

PCT International Search Report—Dec. 22, 2011.
(Continued)

*Primary Examiner* — Sang Kim
(74) *Attorney, Agent, or Firm* — Brinks Gilson & Lione

(57) ABSTRACT

A seat belt retractor with a switchable load limiting device for a safety belt of a motor vehicle with a belt shaft and a locking device which upon actuation locks the belt shaft in the belt extraction direction. The load limiting device is located in the force flow between the belt shaft and the locking device between the load limiting levels. A switching device is used for switching the load limiting device. The switching device includes a gas generator for releasing a gas flow into a pressure chamber and an expandable hollow pot which can be driven by the gas flow. The expandable hollow pot is attached to the gas generator in a gas-proof manner and forms the pressure chamber.

12 Claims, 3 Drawing Sheets

(56) References Cited

U.S. PATENT DOCUMENTS

| | | |
|---|---|---|
| 5,585,596 A | 12/1996 | Richards et al. |
| 5,847,310 A | 12/1998 | Nagahashi et al. |
| 6,227,478 B1 * | 5/2001 | Hudelmaier et al. ......... 242/374 |
| 6,241,172 B1 * | 6/2001 | Fugel et al. ................ 242/379.1 |
| 6,616,081 B1 | 9/2003 | Clute et al. |
| 8,011,696 B2 * | 9/2011 | Singer .......................... 280/806 |
| 8,262,008 B2 * | 9/2012 | Shiotani et al. ............... 242/374 |
| 2010/0276531 A1 * | 11/2010 | Shiotani et al. ............... 242/374 |

FOREIGN PATENT DOCUMENTS

| | | |
|---|---|---|
| DE | 10 2007 021 620 A1 | 2/2008 |
| DE | 10 2009 017 137 A1 | 10/2010 |
| EP | 1 532 370 B1 | 5/2008 |

OTHER PUBLICATIONS

German Examination Report—Aug. 9, 2011.

* cited by examiner

BELT RETRACTOR WITH A SWITCHABLE FORCE-LIMITING DEVICE FOR A SEATBELT OF A MOTOR VEHICLE

CROSS-REFERENCE TO RELATED APPLICATION

This application claims priority to German Patent Application No. 10 2010 053 041.7, filed Dec. 2, 2010 and PCT/EP2011/005710, filed Nov. 12, 2011.

FIELD OF THE INVENTION

The invention relates to a seat belt retractor with a switchable load limiting device for a safety belt of a motor vehicle.

BACKGROUND

A seat belt retractor of the above-referenced type with a switchable load limiting device is known, for example from DE 199 27 427 A1. The load limiting device is formed by a torsion rod with two sections having a different diameter which can be selectively switched by a switching device into the force flow between a belt shaft and a blocking device blocking the belt shaft in the direction of extraction. Depending on whether the section of the torsion rod with the larger diameter or the section with the smaller diameter acts between the belt shaft and the blocking device there is then a large belt extraction force limiting or a smaller belt extraction force limiting. The sections of the torsion rod are separated from each other by a multi-tooth profile across which the torsion rod can be coupled with the belt shaft via a torsion bushing. The torsion bushing in turn is coupled to the belt shaft via several catches which are held in the contact position with the torsion bushing by a shaft ring. The switching device is formed by a pyrotechnically driven, displaceable piston, which upon activation of the switching device, displaces the shaft ring, so that the catches move out of contact with the torsion bushing and the force flow between the belt shaft and the torsion casing is interrupted.

Also known from U.S. Pat. No. 6,616,081 B1 is a seat belt retractor of the same type construction in which a shaft ring rests on a rotatable ring with an axially aligned ramp contour, which upon the activation of the switching device is distorted by a piston driven by means of a gas pressure and the shaft ring is axially displaced by sliding off the ramp contour.

The driven piston respectively limits a pressure chamber which upon the activation of the switching device is impacted with a gas flow standing under a high pressure which in turn powers the piston.

A disadvantage of these solutions is that the pressurized gas flow can exit outward when the piston exits the pressure chamber or the pressure chamber is not completely sealed by the piston. Adjacent component parts can be damaged by the exiting gas pressure or can even be set on fire when a pyrotechnical gas generator with a very hot gas flow is used.

The object of the invention is to make available a seat belt retractor with a switchable load limiting device of described above type, in which the gas flow powering the piston is sealed and does not exit the pressure chamber.

The object of the invention is attained by a seat belt retractor with the features described in accordance with this invention. Preferred embodiments are specified in the figures, and the associated description.

The basic idea of the invention proposes that a piston is located on an expandable hollow pot which is attached to a gas generator in a gas-proof manner and forms the pressure chamber. By means of the proposed use of the expandable pot, the pressure chamber impacted with the gas flow is encapsulated in a gas-proof manner with respect to the surroundings, so that it can be prevented with certainty that the pressurized gas flow exits outward. Furthermore, a simple to mount unit is created which includes all component parts required for activation of the switching device. Another advantage of the invention can be seen in the fact that the piston itself no longer must be guided in a gas-proof manner and no pressure chamber has to be created which must be specially sealed in the seat belt retractor. In addition, the construction is simplified as such, since a separate part, namely the piston, can be eliminated, in that the front end of the pot simultaneously performs the function of the piston and conveys the positioning movement to switch the load limiting device.

BRIEF DESCRIPTION OF THE DRAWINGS

The invention will be explained below based on a preferred embodiment with reference to the attached figures.

DETAILED DESCRIPTION

Figure 1:
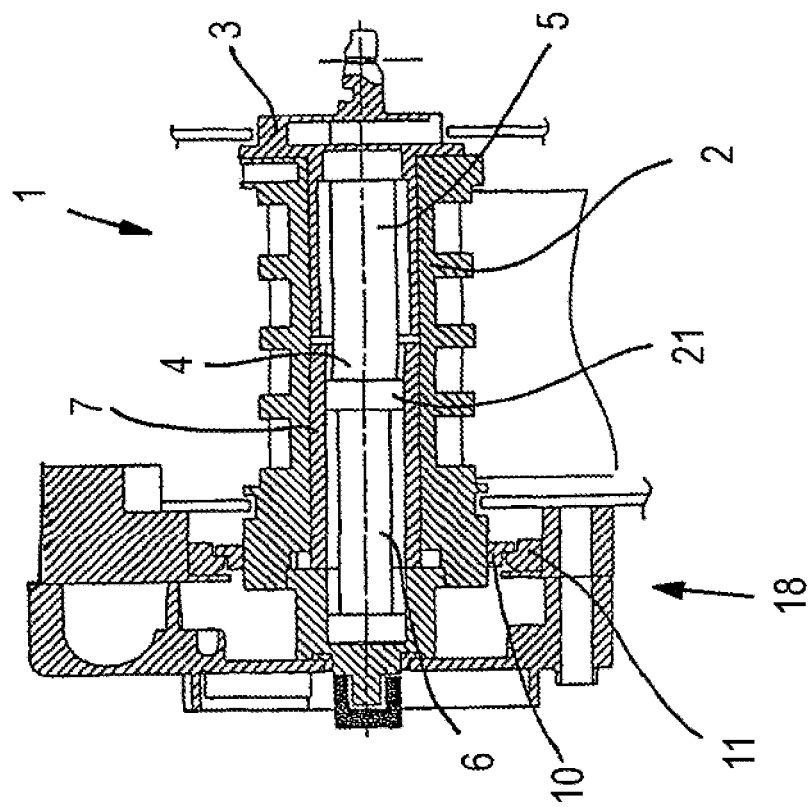
FIG. 1 shows a seat belt retractor with a switchable load limiting device in accordance with this invention.

FIG. 1 shows a portion of a seat belt retractor 1 with a locking device 3 formed by a detent pawl located on a profile head. The locking device 3 blocks the rotational movement of the belt shaft 2 in the belt extraction direction in a known manner when the predetermined seat belt extraction acceleration values or vehicle delay values are exceeded, by guiding the detent pawl into a gearing affixed to the vehicle frame of the seat belt retractor 1. Positioned in the force flow between the belt shaft 2 and the locking device 3 is a switchable load limiting device 4 in the form of a torsion rod 4 with a first section 5 having a large diameter and a second section 6 with a smaller diameter. The first section 5 and the second section 6 are separated from each other by a profile section 21 which is connected in the initial position of the load limiting device 4 to the belt shaft 2 via a torsion casing 7 and catches (not illustrated). Thus at the start of the activation of the load limiting device 4, the first section 5 with the greater load limiting level defined by the larger diameter is actuated. A switching device 18 is provided to switch the switchable load limiting device 4, the switching device includes a shaft ring 10 which holds the catches (not depicted) in the contact position between the torsion casing 7 and the belt shaft 2. In addition a rotatable switching ring 11 is provided which axially rests on the shaft ring 10 across a ramp contour (not depicted). To switch the load limiting device 4, the switching ring 11 is twisted slightly, so that the shaft ring 10 is axially displaced, whereupon the catches can again swivel out of the contact position and the connection between the belt shaft 2 and the torsion casing 7 is released. Because of the released connection, from this point in time the second section 6 with the smaller diameter is actuated and the load limiting level is correspondingly smaller. To that extent the seat belt retractor has a construction like the seat belt retractor known from DE 199 27 427 A1 or U.S. Pat. No. 6,616,081 B1, which are expressly incorporated to the disclosure content of this application for an understanding of the present invention.

Figure 2:
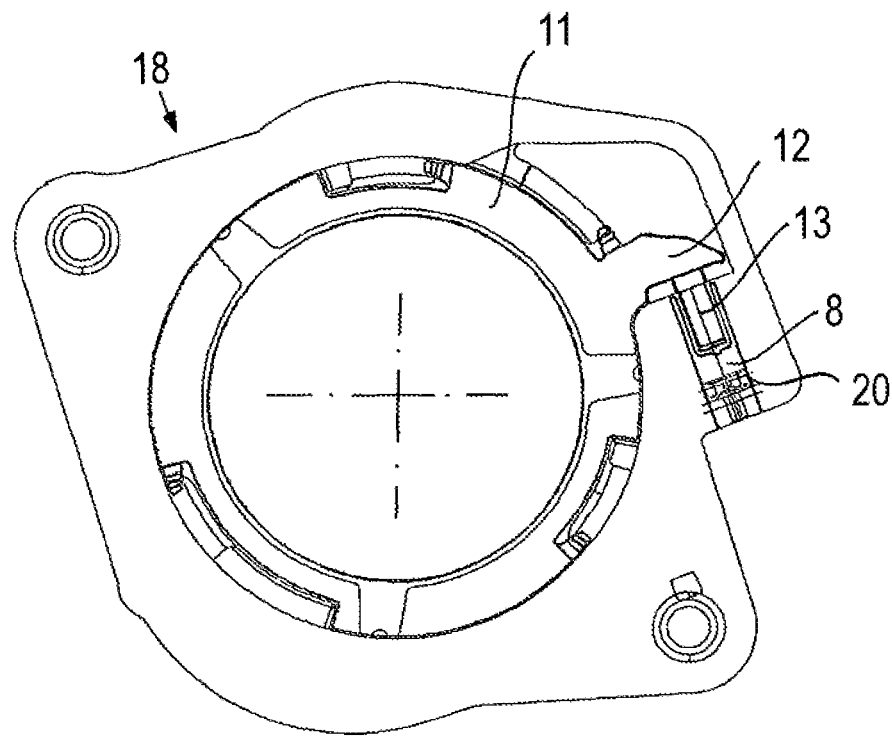
FIG. 2 shows a switching device in accordance with this invention before activation.
Figure 3:
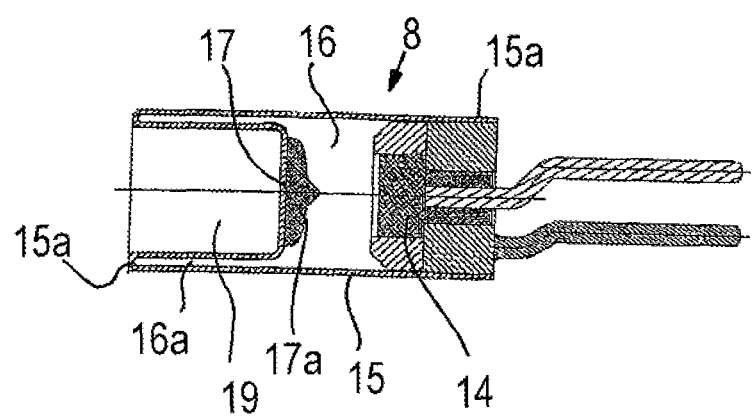
FIG. 3 shows the unit in accordance with this invention consisting of a gas generator and a pot closed in a gas-proof manner forming the pressure chamber.

Recognizable in FIG. 2 is an improved switching device 18 according to the invention with an actuator 8 which is positioned in a mounting 20 on the seat belt retractor 1. The actuator 8 is depicted in an enlarged state in FIG. 3 and includes a gas generator 14 to which a pot (or casing) 15 is attached in a gas-proof manner. The pot 15 encompasses the gas generator 14 on the edge side with a wall 15a which in the assembled position of the actuator 8 is clamped between the gas generator 14 and the inner wall of the mounting 20. The pot 15 is held on the gas generator 14 in a gas-proof manner and also cannot be separated from the gas generator 14 under application of generated gas pressures. The gas-proof connection between the pot 15 and the gas generator 14 can be caused, e.g., by an adhesive or crimp connection which is supported by the clamping of the wall 15a. The pot 15 is hollow and thus forms the pressure chamber 16 which is hermetically sealed outwardly by the pot 15 itself and the gas-proof connection on the gas generator 14. The front end 17 is folded inwards into the pressure chamber 16, so that a second hollow space 19 which is accessible from outside is created and the volume of the pressure chamber 16 is simultaneously reduced. Provided on the front end 17 is a pointed, protruding thickening 17a by means of which the gas flow produced by the gas generator 14 is guided laterally into the ring area 16a formed by the front end 17 folded inward. The pot 15 is constructed in a telescopic manner by means of the front end 17 is folded inward, whereby the pot 15 is expandable without itself being elastic. As a result, a large expansion movement in relation to the size of the pot 15 can be achieved with a very small pot 15. The pot 15 itself can be formed from thin sheet steel of preferably 0.3 to 0.6 mm gage, so that even in the expanded state, it exhibits the required strength in order to withstand the internal pressure of the gas produced by the gas generator 14. In addition, the pot 15 exhibits the strength required to convey the needed positioning forces to be transferred to the switching ring 11.

As is recognizable in FIG. 2, a radially protruding arm 12 is provided on the switching ring 11 from which protrudes a cylindrically-shaped projection 13 aligned in the direction of the actuator 8. The projection 13 extends into the hollow space 19 and rests on the outside against the front end 17 of the pot 15, so that due to the beginning expansion movement of the pot 15, the switching ring 11 is driven directly to execute the turning movement causing the switching movement of the shaft ring 10. The turn angle of the switching ring 11 can be enlarged by the projection 13 extending into the hollow space 19, since the stroke acting from the actuator 8 on the arm 12 is increased by the length of the projection 13 extending into the hollow space 19. The projection 13 need not rest directly against the front end 17, however, the abutment of the projection 13 is preferred in this respect, since as a result the switching movement to be produced can be maximized and in addition any possible impulse forces caused by a gap between these parts can be minimized.

Since the gas flow produced by the gas generator 14 is guided by the pointed thickening 17a into the ring area 16a, the driving pressure acting on the fold 15a of the pot 15 can also be increased and the expansion movement of the pot 15 can be accelerated accordingly. Furthermore, the thickening 17a causes a stiffening of the front end 17 of the pot 15, so that the expansion movement of the pot 15 is basically caused by the rolling of the fold 15a and the extension of the front end 17 of the pot 15, without the front end 17 thereby being appreciably deformed.

Figure 4:
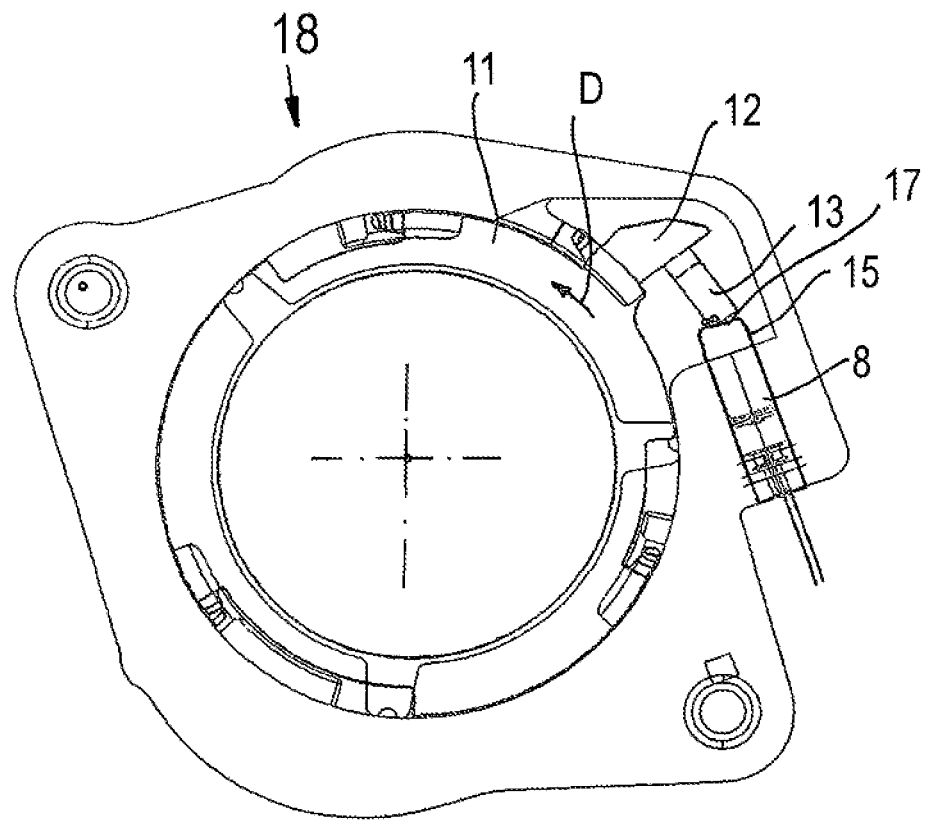
FIG. 4 shows the switching device in accordance with this invention after activation.

The actuator 8 is shown in FIG. 4 in the position after the expansion of the pot 15. Due to the activation of the gas generator 14, the pot 15 is expanded so much that the front side 17 of the pot 15 exits from the mounting 20 and thereby has twisted the switching ring 11 in the turning direction D. The turning direction of the switching ring 11 is used then in the same manner to switch the load limiting device 4, as previously described in U.S. Pat. No. 6,616,081 B1. Cold gas generators can be used as preferred gas generators 14, whereby firstly the thermal stress of the pot 15 can be reduced, and secondly in case of accidentally occurring leaks, the emission of a hot flame can be prevented.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor with a switchable load limiting device for a safety belt of a motor vehicle comprising:
   a belt shaft and a locking device which upon actuation locks the belt shaft in a belt extraction direction, wherein the load limiting device is located in the force flow between the belt shaft and the locking device, and
   a switching device for switching the load limiting device between at least two load limiting levels, the switching device having a gas generator for releasing a gas flow into a pressure chamber formed by an expandable hollow pot having an edge fixedly attached to the gas generator in a gas-proof manner and forming the pressure chamber and having a front end with an indentation forming a hollow space, the hollow pot expanding until the hollow space is eliminated in response to the gas flow without releasing the gas flow outside the pressure chamber, the hollow pot acting on a switching element of the switching device to switch between the load levels.

2. The seat belt retractor according to claim 1, wherein the expandable hollow pot is telescopic.

3. The seat belt retractor according to claim 1, wherein the gas generator is located in a mounting, and that the hollow pot is attached to the gas generator in a gas-proof manner via a wall which is clamped between the gas generator and the mounting.

4. The seat belt retractor according to claim 1, wherein the hollow pot is formed from sheet steel having a wall thickness of 0.3 to 0.6 mm.

5. The seat belt retractor according to claim 1, wherein the gas generator is a cold-gas generator.

6. The seat belt retractor according to claim 1, wherein the switching element is a switching ring with the projection in a path of expansion of the piston such that the expanding piston rotates the switching ring from a first angular position to a second angular position.

7. The seat belt retractor according to claim 6, wherein the first angular position of the switching ring secures a high load limit and the second angular position allows a low load limit.

8. A seat belt retractor with a switchable load limiting device for a safety belt of a motor vehicle comprising:
   a belt shaft and a locking device which upon actuation locks the belt shaft in a belt extraction direction, wherein the load limiting device is located in the force flow between the belt shaft and the locking device, and
   a switching device for switching the load limiting device between at least two load limiting levels, the switching device having a gas generator for releasing a gas flow into a pressure chamber formed by an expandable hollow pot which is attached to the gas generator in a gas-proof manner and forms the pressure chamber the hollow pot expanding in response to the gas flow without releasing the gas flow outside the pressure chamber, the hollow pot acting on the switching device to switch between the load levels, wherein the hollow pot includes a front end which prior to the activation of the gas generator is folded inwards to form a hollow space which is accessible from the outside, and that the switching device includes a projection which extends into the hollow space and is positioned adjacent to the front end.

9. The seat belt retractor according to claim 8, wherein the front end of the hollow pot moves linearly between a normal condition and an actuated condition when the gas flow is produced and the front end engages the projection in the actuated condition.

10. The seat belt retractor according to claim 8, wherein the hollow pot at the front end forms a thickening.

11. The seat belt retractor according to claim 10, wherein the thickening forms a pointed portion which guides the gas flow toward a ring area formed by the front end as the hollow pot unfolds from the folded inward condition, to a fully expanded condition.

12. The seat belt retractor according to claim 8, wherein the switching device includes a rotatable switching ring having a radially protruding arm, and the projection against which the hollow pot rests tangentially to the direction of rotation of the switching ring.

* * * * *